No. 893,205. PATENTED JULY 14, 1908.
W. H. STEDMAN.
CONTROLLING DEVICE FOR FEED MECHANISMS.
APPLICATION FILED DEC. 6, 1906.
2 SHEETS—SHEET 1.
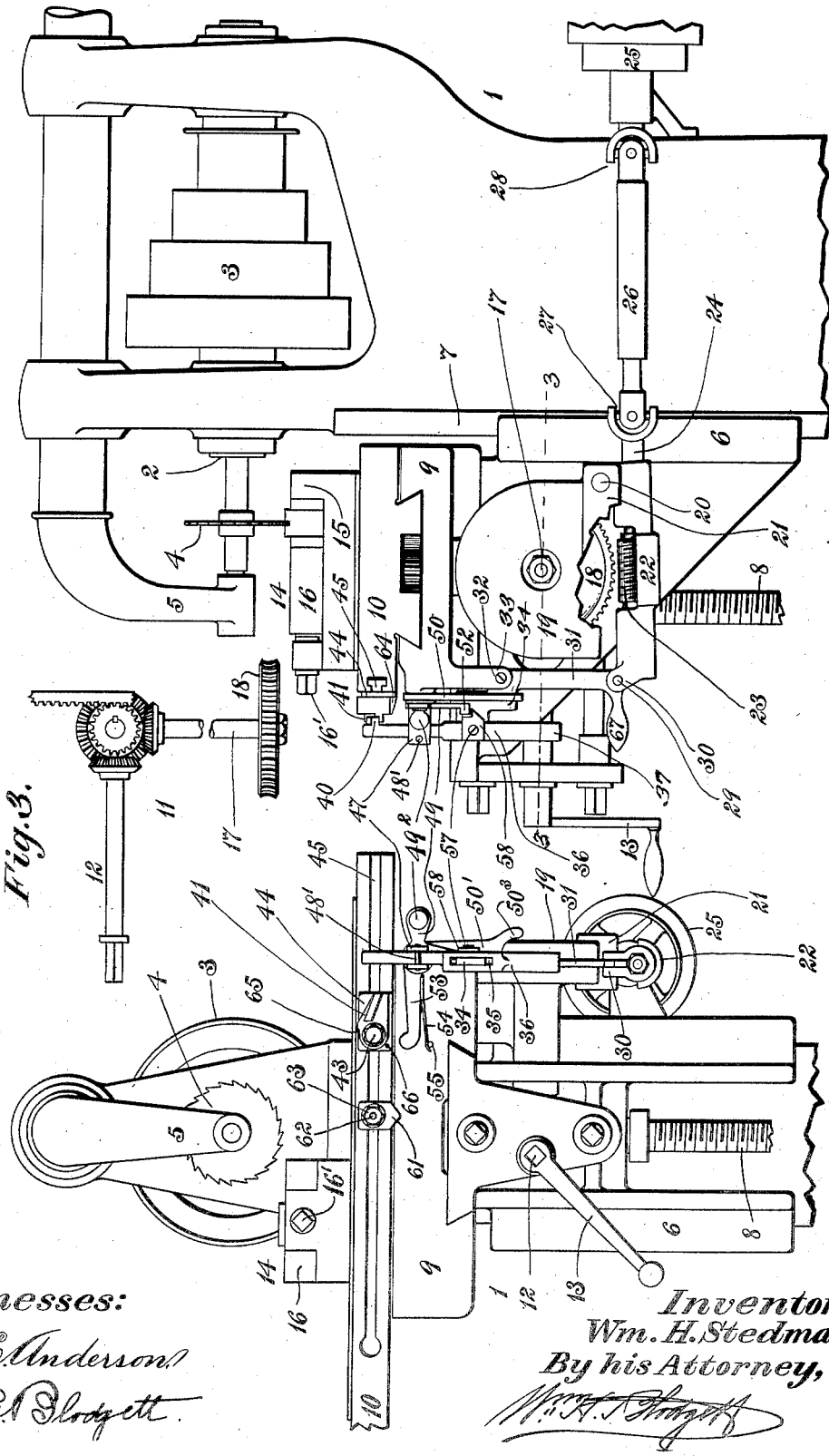
Witnesses:
F. E. Anderson
S. N. Blodgett
Inventor:
Wm. H. Stedman
By his Attorney,

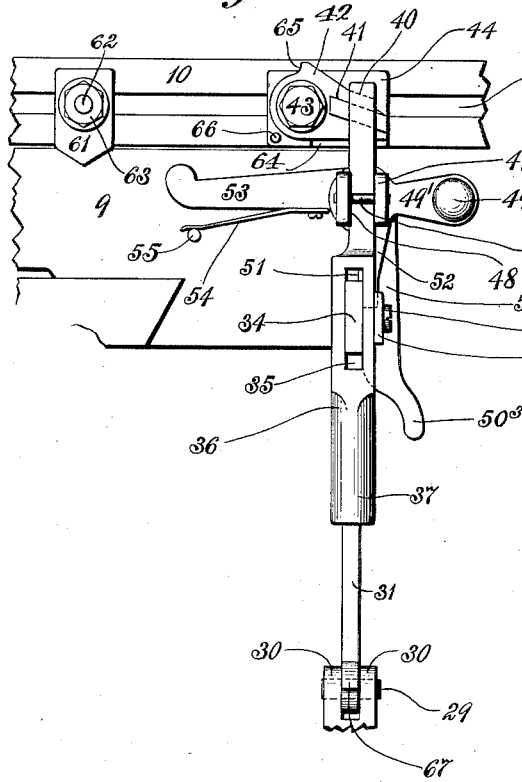
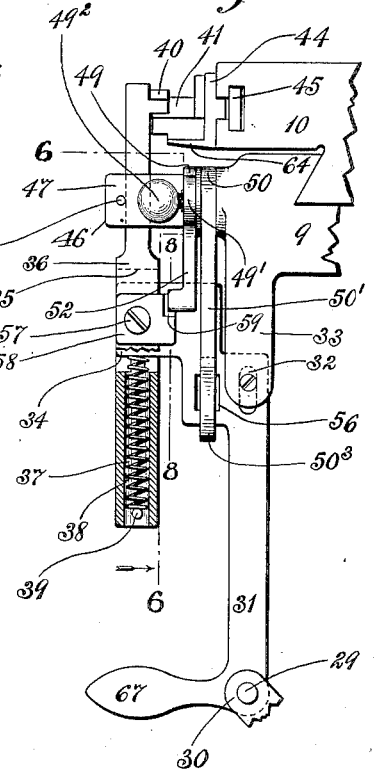
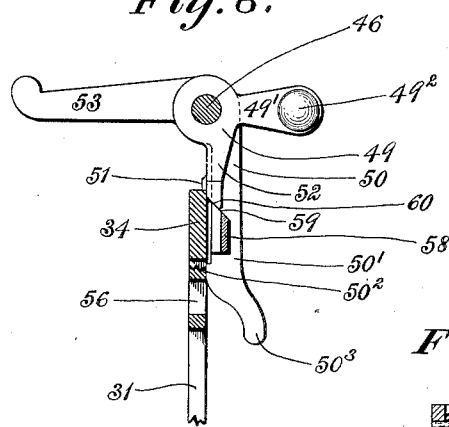
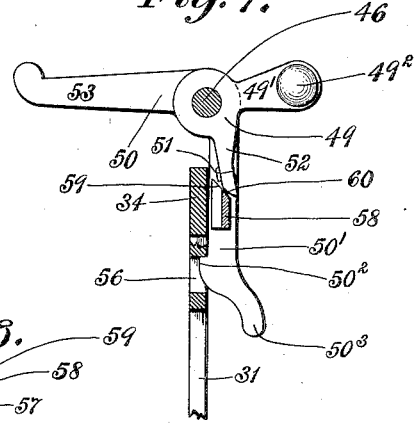
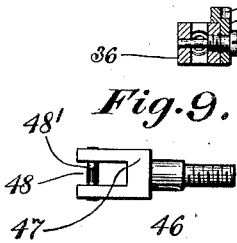

UNITED STATES PATENT OFFICE.

WILLIAM H. STEDMAN, OF HARTFORD, CONNECTICUT.

CONTROLLING DEVICE FOR FEED MECHANISMS.

No. 893,205.   Specification of Letters Patent.   Patented July 14, 1908.

Application filed December 6, 1906. Serial No. 346,550.

*To all whom it may concern:*

Be it known that I, WILLIAM H. STEDMAN, a citizen of the United States, residing at Hartford, in the county of Hartford and State of Connecticut, have invented certain new and useful Improvements in Controlling Devices for Feed Mechanisms, of which the following is a specification.

This invention relates to metal-working machines, and more especially to that class thereof in which the work to be operated upon must be fed to the cutting tool so as not to exceed a certain predetermined speed, as for instance in milling machines, and it has for one of its objects the provision of means whereby such feed during the tooling operation is positively confined to the required speed, without however affecting the speed of the hand-feed of the movable element of the machine, (be it either the work-support, or the cutting tool, or both) preparatory to the tooling operation.

My invention is particularly applicable to a milling machine in which a number of similar pieces of work are to be operated upon successively, and by unskilled help, so that the operator may, after placing the work into its support when in a position remote from the cutter, rapidly advance the work support toward the tool, without paying any attention whatever to reducing the speed of the hand-feed when the cutter is about to engage the work, inasmuch as at this point the hand-feed is automatically rendered inoperative, and the power-feed is thrown into action.

From the foregoing it will be understood that injury to either, work or cutter, by an over-rapid feed by hand, due to carelessness or inattention of the operator, will be entirely obviated, as well as the care heretofore required in bringing the work into precisioned juxtaposition relative to the tool. It is, therefore, obvious that considerable time may be saved, and skill in operating the machine be dispensed with.

My invention has, furthermore, for its object the provision of means for automatically bring the movable element of the machine into condition to be controlled by the power feed mechanism at a certain predetermined point of its movement relative to the other element.

Another object of the invention resides in the provision of a yielding device for throwing the power feed mechanism into operation by the movement of the movable element, so that the latter may perform this function without liability of breaking any of the parts of the driving mechanisms.

Further objects of the invention will appear hereinafter, and be particularly pointed out in the claims.

In the accompanying drawings, in which similar characters denote similar parts, Figure 1 is a front view of a milling machine embodying my invention. Fig. 2 shows a side view thereof. Fig. 3 is a diagrammatic view of the feed mechanism, taken substantially on line 3, 3 of Fig. 2. Fig. 4 is a front view of the mechanism for controlling the power-feed. Fig. 5 is a side view thereof. Figs. 6 and 7 are sectional views on line 6, 6 of Fig. 5, showing different positions of certain parts. Fig. 8 is a sectional detail view on line 8, 8 of Fig. 5, and Fig. 9 is a detail view hereinafter described.

Briefly stated, the present machine here illustrated, comprises a work-supporting table, which may be moved relatively to the cutter, by a primary or hand-operated mechanism, up to a point where the work is just about to be acted upon by the cutting tool. At this point the table-movement is positively checked, and a power-feed or secondary mechanism is thrown into action, so that the table is then entirely under the control of the latter, and the hand-operated mechanism is rendered inoperative, although still connected with the table, as before.

Referring to the drawings, the numeral 1 designates in a general way the frame of a milling-machine in which is journaled a spindle 2 driven by belting applied to a cone-pulley 3, and carrying a cutter 4, one extremity of the spindle being supported in the end of an over-hanging arm 5 in the usual manner.

A knee 6 is supported for vertical movement on ways 7 of the frame or column 1, and said knee may be adjusted by a screw 8 or by other devices actuated by well-known mechanism (not shown). On a part of the knee 6 is supported for adjustment a carriage 9, and on said carriage is mounted a table 10 reciprocable manually by a train of gearing 11 (see Fig. 3), actuated by a shaft 12 and handle 13 applied to the squared end of said shaft, these elements constituting the primary driving mechanism.

A work-support 14 having a fixed jaw 15, and a movable jaw 16 actuated by a screw or other device 16' is carried by the table 10.

Extending from the table-actuating gear-train 11, and suitably connected thereto, is a shaft 17 provided at its outer end with a worm-gear 18, surrounded by a guard or casing 19, partially broken away in Fig. 2. Pivoted at 20 to an extension 21 of worm-gear casing 19 is a worm-box 22 carrying a worm 23 and worm-shaft 24, which constitutes a part of the secondary driving mechanism. Power for rotating said worm-shaft may be transmitted from the pulley 25 through a telescopic-shaft 26, provided with universal joints 27 and 28, in order to permit the raising and lowering of the knee 6, and also to allow a slight movement of the worm-box 22 with the worm 23 to engage or disengage the worm-gear 18.

Means are provided for throwing the secondary mechanism, or, more particularly speaking, the worm 23 into engagement with the worm gear 18, at such point of the travel of the table, as the operator may, in the first place, decide upon, such engagement serving to stop, and consequently render inoperative, the primary or manually-operated driving mechanism, inasmuch as the worm shaft 24 has no endwise movement in the box 22. In order to effect this engagement in a positive manner, and so that no possibility can exist to actuate the table by hand beyond a certain point (in which case damage to either tool or work, or both, may result), I deem it advantageous to secure the engagement-actuator to the table itself, and to employ a resilient connection with the worm-box, instead of a rigid one, for the reason that: as the table moves along on its ways, the worm-box is gradually raised, and the teeth of the worm and worm gear may perchance "crown" together and consequently something would have to break. By the employment of a resilient connection, however, such trouble is avoided, since the engagement actuator on the table would in that case only serve to tension the connection and the actual mesh of worm and gear will result only as soon as a tooth of the gear will be opposite the nearest space of the worm, at which time the tension of the connecting member will cause an instantaneous tooth-engagement between these members. In the present instance I accomplish this result as follows: Pivoted on a pin 29 carried by ears 30 on the end of the worm-box 22, is a vertically-movable slide member 31 guided at 32 on an arm 33 depending from the carriage 9. A forward extension 34 of the link 31 enters a rectangular slot 35 in a rod 36.

Within the lower tubular portion 37 of rod 36 is a spring 38 (see Fig. 5), held therein by a pin 39 at one extremity, and bearing at its other end against the lower edge of the extension 34 of link 31. At the upper end of the rod 36 is preferably inclined projection 40, adapted to be engaged by a similarly inclined cam-surface 41 of the engagement-actuator 42, which is pivotally mounted upon the shank of a bolt 43 carried by a block 44, said bolt 43 serving also adjustably to secure the block 44 in a T-slot 45 of the table 10.

Projecting from the carriage 9 is a stud 46 (Figs. 5 and 9), having a head 47 provided with a slot 48 to form a guideway for the rod 36, which is held for vertical sliding movement in said slot by a pin 48'.

Pivoted upon the stud 46 are latches 49 and 50, the former of which has an arm 49' provided with a weight $49^2$ so that gravity will affect it in a way normally to cause a catch or projection 51 (see Fig. 6), on its other arm 52 to engage the top edge of the extension 34 of slide 31, when the latter is in its extreme lower position, and the worm 23 is out of mesh with the worm-wheel 18 (see Fig. 2). When now the rod 36 is raised by the actuator 42 on the table, the projection 51 of latch 49 will prevent the slide member 31 from rising, thus tensioning the spring 38 which will become effective in suddenly raising the slide 31 and consequently bring the worm 23 into contact with the worm gear 18, as soon as the catch 51 is released from the slide-projection 34, as for instance by a trip plate 58 which is secured to the rod 36 by a screw 57, and has a beveled surface 59, adapted to engage a beveled portion 60 of the latch 49 (see Fig. 7), when the rod 36 is about to reach its extreme upward travel.

By referring to Fig. 3 it will be seen, that by virtue of the gearing 11, the worm gear 18 will be rotated at a comparatively rapid circumferential speed, by the manually-operated mechanism, and hence it follows that the actual tooth-engagement between said gear and the worm must take place practically immediately after the release of the slide 31, and the hand-operation, therefore, becomes inoperative.

In order to prevent the disengagement of the worm 23 from the gear 18 after the actuator 42 has raised, and passed beyond, the projection 40 of rod 31, I preferably employ the following device.

Depending from latch 50, is an arm 50' provided with a shoulder or hook $50^2$, said arm being extended to form a finger-grasp $50^3$. Another arm 53 extends at a right angle to arm 50', and has secured to its under side a spring 54, the end of which bears against a pin 55 fixed in the carriage 9. Said spring tends normally to cause the shoulder $50^2$ on arm 50' to bear against the side of link 31 and to enter an opening 56 therein when said link is in its extreme upward position and worm 23 is in mesh with worm-wheel 18 (see Fig. 6). This mesh-engagement between worm and worm gear will now be maintained until the slide 31 is permitted to drop by gravity, by the withdrawal of the hook $50^2$ either by hand (as per grasp $50^3$) or else automatically at the completion of the movement of the table, which latter carries a knock-off dog 61 adjustably secured in a T-slot 45 of the table 10, by a bolt 62 and a nut 63, and adapted to engage the arm 53 of the hook-latch 50.

A ledge 64 of block 44 supports the rod-actuator 42 and projection 41 in the position shown in Figs. 1, 4, and 5, and said actuator may be placed in an inoperative position by turning the same upon bolt 43 until the shoulder 65 thereof engages a stop-pin 66 on the block 44. At the same time, the pivotal support of the actuator will allow the latter to ride over the projection 40 on rod 35 during the return movement of the table which may be accomplished in any desired manner.

In order to enable the operator conveniently to throw the power-feed into engagement by hand, link 31 is extended at its lower extremity into a suitable handle 67.

The operation of a machine comprising a mechanism embodying the principle of my invention is as follows: The work to be operated upon is clamped in the vise or jig, while remote from the cutter 4. The block 44 on which the actuator 42 is mounted, is then secured in T-slot 45 of table 10 at such a point that it will engage the projection 40 of rod 36, and, through connections before described, throw in the power-feed just before the cutter 4 comes into contact with the work mounted on said table 10, the latter being caused by means of the table-actuating gearing 11 and crank-handle 13 to approach said cutter. When the power-feed is in engagement it is impossible further to actuate the hand-feed and it is obvious that injury and destruction of work and cutters due to unskilled use of the hand-feed cannot occur, and the loss of time heretofore necessarily spent in bringing the work up to the cutter on machines which are not equipped with my improved mechanism, will be avoided. By properly locating the knock-off dog 61 the power-feed may be thrown out of operation at any desired point.

Many changes may be made in the various parts of the machine, and the proportion and disposition of said parts may be varied from what is shown, without departure from the invention. So too, substitutes may be employed for many of the details shown for throwing in and out of action the feed mechanism if desired.

I claim:—

1. The combination, with a work-support, of manually-actuated mechanism for first actuating the same to a predetermined position, a device carried by said work-support, and power-driven mechanism adapted to be thrown into action by said device, and serving to continue the movement of said work-support until the stroke of the same is completed.

2. The combination, with a work-support, and with independent means for actuating the same in one direction, both manually and by power, respectively, of means for throwing the power-actuated means automatically into action during and by the action of the manually-operated means.

3. The combination, with a work-support, and with a tool-support, of means for actuating one of said elements with relation to the other, said means including manually-operated mechanism for bringing one of the elements to a predetermined position; a power-drive for the movable element; and means adapted to be actuated by the movable element for throwing into operation the power-drive at a predetermined point of its movement.

4. The combination, with a work-support, and with a tool for operating on the work carried by said work-support, of a carrier for the work support; a power drive arranged to positively drive and exclusively control the movement of said carrier; mechanism for throwing into action said power drive; and means on the carrier for operating said mechanism at a predetermined position of the work-support relative to the tool.

5. The combination, with a reciprocatory table, and a work-support mounted thereon, of gearing for primarily actuating said table to a predetermined position; power-actuated means arranged to positively drive and exclusively continue the movement of the table, a cam carried by the table, and devices coöperating with said cam for throwing into action said power-actuated means.

6. In a milling machine, the combination, with a tool spindle and a tool carried thereby, of a work-support; a carriage supporting said work-support; means for reciprocating said carriage to a predetermined point; a device carried by the work-support; power controlled gearing for continuing the movement of said work-support, means actuated by said device for throwing into operation said power-controlled gearing, a latch for maintaining said gearing in operation, and a device carried by the work-support and for releasing said latch.

7. The combination, with a carriage, and with a tool support, a manually-operable mechanism for actuating one of said members toward the other, and a power-drive positively controlling and continuing the movement of the movable member during the tooling action, of a slide member for controlling the operation of the driving mechanism, latches coöperative with the slide, and means on the carriage for connecting and disconnecting said latches.

8. The combination, with a movable work-support, a manually-operated mechanism therefor, and a power-drive for said work-support, and comprising gearing, of a slide for controlling said gearing, an actuator for said slide and a device carried on the work-support for operating said actuator to connect and disconnect said gearing at a predetermined point of the work-support movement while under the control of the manual mechanism.

9. The combination, with a movable work-support, a manually-operated mechanism therefor, and a power-drive for said work-support, of a slide for connecting said power-drive, means carried by the work support and for operating said slide at a predetermined point of its manually-operated movement, a latch for maintaining said slide in its active position, and means carried by the support and for disconnecting said latch from the slide at the end of the work-support movement.

10. The combination, with a movable work-support, and a power-drive coöperable therewith, of means for primarily actuating said work-support to a predetermined position, a slide for connecting the power drive, a latch for maintaining said slide in its disconnecting position, yielding means for operating said slide and operable by the work-support, and a device carried by the slide-operator and for disengaging said latch from the slide.

11. The combination, with a tool-support, of a work-holder; means for imparting movement to one of said elements relative to the other; a device adapted to be engaged by the movable element, for positively checking the rapid movement of the movable element when the tool is about to engage the work; and means for continuing the movement of the movable element at a predetermined speed during the tooling operation.

12. The combination, with a longitudinally-movable carriage, of a work-support mounted thereon; manually-actuated mechanism for moving the work-support to a predetermined point; automatic mechanism comprising a worm gear and a rotating worm for continuing the movement of said work-support, and means carried by the work-support for throwing said worm and gear into engagement.

13. The combination, with a work-support, means for tooling the work held thereby, and a primary mechanism for advancing one of said elements toward the other, of means actuated by the movement of the movable element for rendering inoperative said primary mechanism preparatory to the tool engaging the work, and a secondary mechanism for positively controlling and continuing the advancing movement of the movable element at a predetermined speed during the tooling operation.

In testimony whereof I affix my signature in presence of two witnesses.

WILLIAM H. STEDMAN.

Witnesses:
F. E. ANDERSON,
FRANCIS E. BLODGETT.